US007013462B2

(12) United States Patent
Zara et al.

(10) Patent No.: US 7,013,462 B2
(45) Date of Patent: Mar. 14, 2006

(54) METHOD TO MAP AN INVENTORY MANAGEMENT SYSTEM TO A CONFIGURATION MANAGEMENT SYSTEM

(75) Inventors: Anna M. Zara, Menlo Park, CA (US); Sharad Singhal, Belmont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 936 days.

(21) Appl. No.: 09/854,209

(22) Filed: May 10, 2001

(65) Prior Publication Data

US 2004/0015957 A1 Jan. 22, 2004

(51) Int. Cl.
*G06F 9/445* (2006.01)

(52) U.S. Cl. ....................... 717/177; 717/171; 717/176; 709/221

(58) Field of Classification Search ......... 717/174–177, 717/172, 170; 709/220–221
See application file for complete search history.

(56) References Cited

U.S. PATENT DOCUMENTS 5,717,930 A * 2/1998 Imai et al. .................. 717/176
5,978,590 A * 11/1999 Imai et al. .................. 717/177
6,067,582 A * 5/2000 Smith et al. ................... 710/5
6,304,892 B1 * 10/2001 Bhoj et al. .................. 709/202
6,304,906 B1 * 10/2001 Bhatti et al. ................ 709/227
6,366,876 B1 * 4/2002 Looney ....................... 703/25
6,499,115 B1 * 12/2002 Wiedeman et al. ........... 714/30
6,640,278 B1 * 10/2003 Nolan et al. ................... 711/6
6,651,093 B1 * 11/2003 Wiedeman et al. ......... 709/221
6,651,141 B1 * 11/2003 Adrangi ...................... 711/118
6,708,187 B1 * 3/2004 Shanumgam et al. ....... 707/201
6,842,749 B1 * 1/2005 Zara et al. ..................... 707/3
6,857,012 B1 * 2/2005 Sim et al. ................... 709/222
6,859,882 B1 * 2/2005 Fung .......................... 713/300

OTHER PUBLICATIONS

Ratnasamy et al, "A scalable content addressable network", ACM SIGCOMM, pp 161–172, Aug., 27–31, 2001.*

Lowell et al, "evirutalizable virtual machines enabling general single node online maintenance", ACM ASPLOS, pp 211–223, Oct. 9–13, 2004.*

Amir et al, "An active service framework and its application on real time multiledia transcoding", ACM SIGCOMM, pp 178–189, 1998.*

* cited by examiner

*Primary Examiner*—Anil Khatri

(57) ABSTRACT

The invention includes a method, system, and article to automatically soft configure a node, such as a compute node, in a data center. The data center may have several racks and a unit may be installed in one of the racks as the node. Each rack may be identified by a unique rack location. The data center may include various servers, devices, and rack locations tied together through a Local Area Network (LAN) mechanism. A new unit deployed within the data center may be discovered. A configuration template for the discovered unit may then be found. Based on the configuration template, software automatically may be installed no the discovered unit.

45 Claims, 6 Drawing Sheets

METHOD TO MAP AN INVENTORY MANAGEMENT SYSTEM TO A CONFIGURATION MANAGEMENT SYSTEM

FIELD OF THE INVENTION

The invention relates generally to processes for configuring and installing products in a data center or warehouse environment.

BACKGROUND

Companies and other large entities increasingly rely on distributed computing where many user terminals connect to one or more servers that are centrally located. These locations called "data centers" may be facilities owned by the company or may be supplied by a third-party. These data centers house not only computers, but may also have persistent connections to the Internet and thus, conveniently house networking equipment such as switches and routers. Web servers and other servers that need to be network accessible are often housed in data centers. Where a third-party owns the data center, the entity in question rents a "cage" or enclosure that has racks upon which assembled/standalone units, such as computers and routers, can be installed. The entity may also simply lease the units that are rack-mountable from the third-party. In any case, the data center is usually divided into a number of predefined areas, including a shipping/docking area, assembly area, and area where enclosures and their constituent racks are kept.

Typically, the business process of installing and configuring new computer or networking systems involves a series of independent stages. First, based on determined requirements, components of the systems are ordered through a vendor or supplier. Once the components for these systems are received, inventory logs the "asset" tag for the component which identifies it for future reconciliation/audits. While the order for the components themselves may identify a number of attributes that each component should have (i.e. amount of memory, number of ports, model number etc.), the inventory systems often do not, and may only be concerned with the fact that the item was in fact received, and what the serial number or other distinguishing identifier is. Conventional asset records track accounting information such as depreciation, but not other attribute information.

Once a component or set of components is received it is installed in the data center. Installation and assembly of components that make up a deployable "asset" is not typically performed by those employed in the receiving/warehousing department or by those who track inventory. After the component is physically assembled or installed, it will need to attain a "soft" configuration. The soft configuration includes attributes such as the IP (Internet Protocol) address, operating environment and so on. This soft configuration information frequently depends upon the attributes of the component. For instance, when installing software applications on a computing system asset ("compute node"), the operating system image to be deployed may depend on the size of the disk in the asset. Similarly, the MAC (Media Access Control) address of the network interface card may be needed to give the asset a correct IP address. The current environment relies on highly skilled employees for all aspects of component assembly and configuration. Because such skilled workers are in short supply, the assembly and configuration of new components in a data center can take weeks.

The management system is the vehicle and charge of the administrative or Information Technology (IT) departments within a large entity such as a corporation. The management system must identify, once products are received, what they consist of, and how to configure or install them. This information must be either discovered by the management system or re-entered into the management system by the skilled workers who configure and install the component. As is often the case, the skilled assembler must take the received components and inspect/test them to find out its attributes and configuration because the original order data and the received physical component cannot be easily correlated.

There is thus needed a more efficient configuration process that requires less use of skilled workers and increases the reliability of the configuration job and time-to-deployment of components.

SUMMARY

The invention includes a method, system, and article to automatically soft configure a node, such as a compute node, in a data center. The data center may have several racks and a unit may be installed in one of the racks as the node. Each rack may be identified by a unique rack location. The data center may include various servers, devices, and rack locations tied together through a Local Area Network (LAN) mechanism. A new unit deployed within the data center may be discovered. A configuration template for the discovered unit may then be found. Based on the configuration template, software automatically may be installed no the discovered unit.

DETAILED DESCRIPTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

The invention primarily consists of utilizing a management system to control the configuration and installation of software on a compute node. The management system maintains a database of asset records, and for each node, when the node is first requested or ordered, it creates an asset record and asset ID unique to that asset. The asset record is associated with the node based upon a certain parameter such the MAC address of the node's NIC. Once a node is deployed it sends out a network request. Based on this request, the management system proceeds with a new unit discovery process. The management system then finds a configuration template suitable for the node. Finally, using the configuration template, software is automatically installed on the node.

Figure 1:
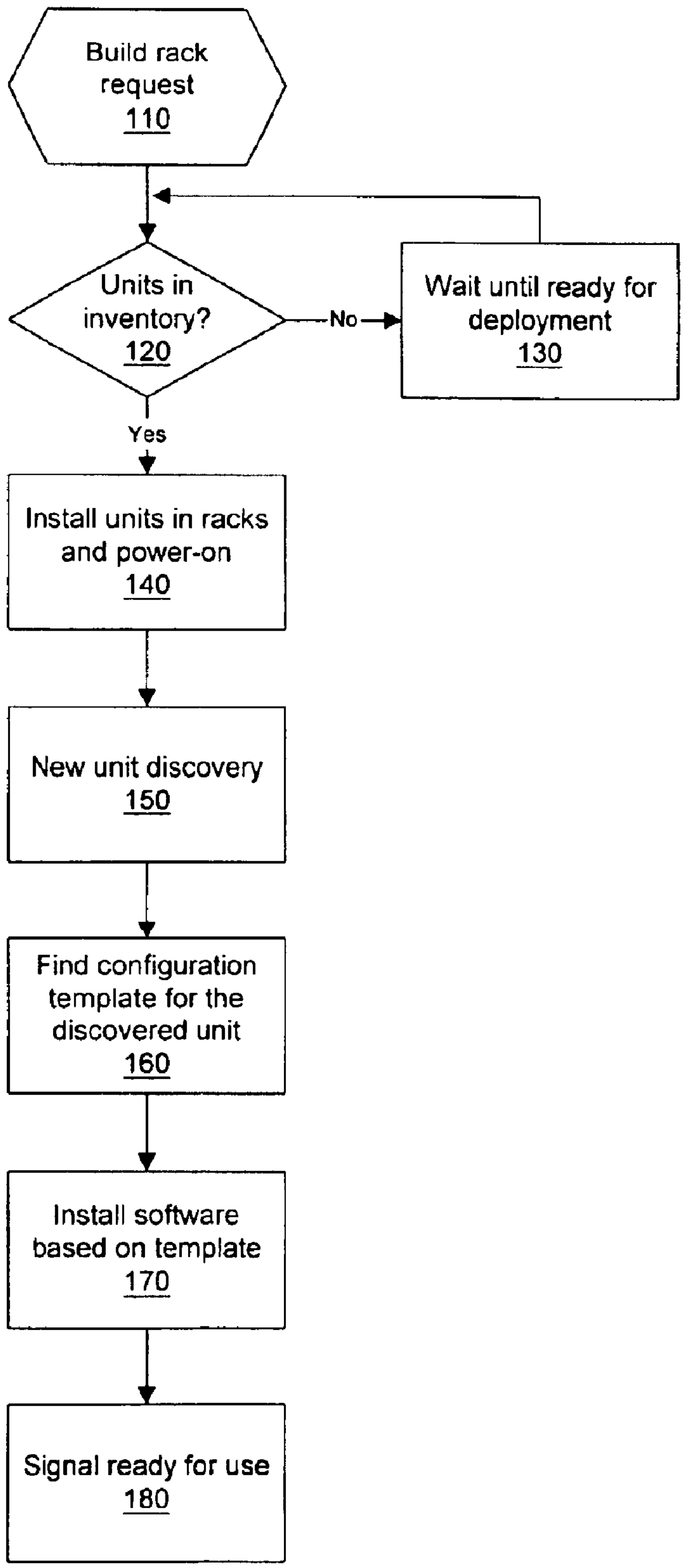
FIG. 1 is a flowchart of the primary methodology in mapping an inventory management system to a configuration management system according to one or more embodiments of the invention.

FIG. 1 is a flowchart of the primary methodology in mapping an inventory management system to a configuration management system according to one or more embodiments of the invention. First, the inventory or ordering system will build a request for units to be deployed in a rack (block 110). For instance, if it were determined that a computer system needs to be deployed in a given rack, a request for that system is built. This type of request typically accompanies an order to a vendor for the components of the unit. However, the unit can also be built based on components already in inventory. Thus, according to block 120, there is check as to whether the units (and their components) are in inventory. If the units are not in inventory, the management system must wait until the units are in inventory and ready for deployment (block 130). Once the units are in inventory, they are installed in the racks and powered-on (block 140).

At this point, the node has been bolted into a rack, has been plugged to power and networking and has been powered on. By using network messaging (described in detail with respect to FIG. 2), the new unit will undergo a discovery process (block 150). In the new unit discovery, the unit will broadcast a message on the network requesting the management system to provide it with configuration data. The management system uses the information provided by the unit to find a configuration template for the discovered unit (block 160). The configuration templates are a series of configuration parameters and instructions that are stored/created for different classes or types of units. Depending upon the type, model or class of the unit, the management system or other specialized system (e.g., see software configuration system, described below) will find an appropriate configuration template (block 160).

Once a configuration template is found, the management system or other specialized system (e.g., see software configuration system, described below) will install software on the unit based on the parameters given by the template (block 170). Alternatively, the management system may provide the unit with instructions on how to install this software. This automatic installation of software is made possible in a data center environment partially because the management system database contains information about the attributes (such as the MAC address of the network interface card (NIC) in the unit). Once the software is installed, the unit can signal to the management system that it is ready for use (block 180).

Figure 2:
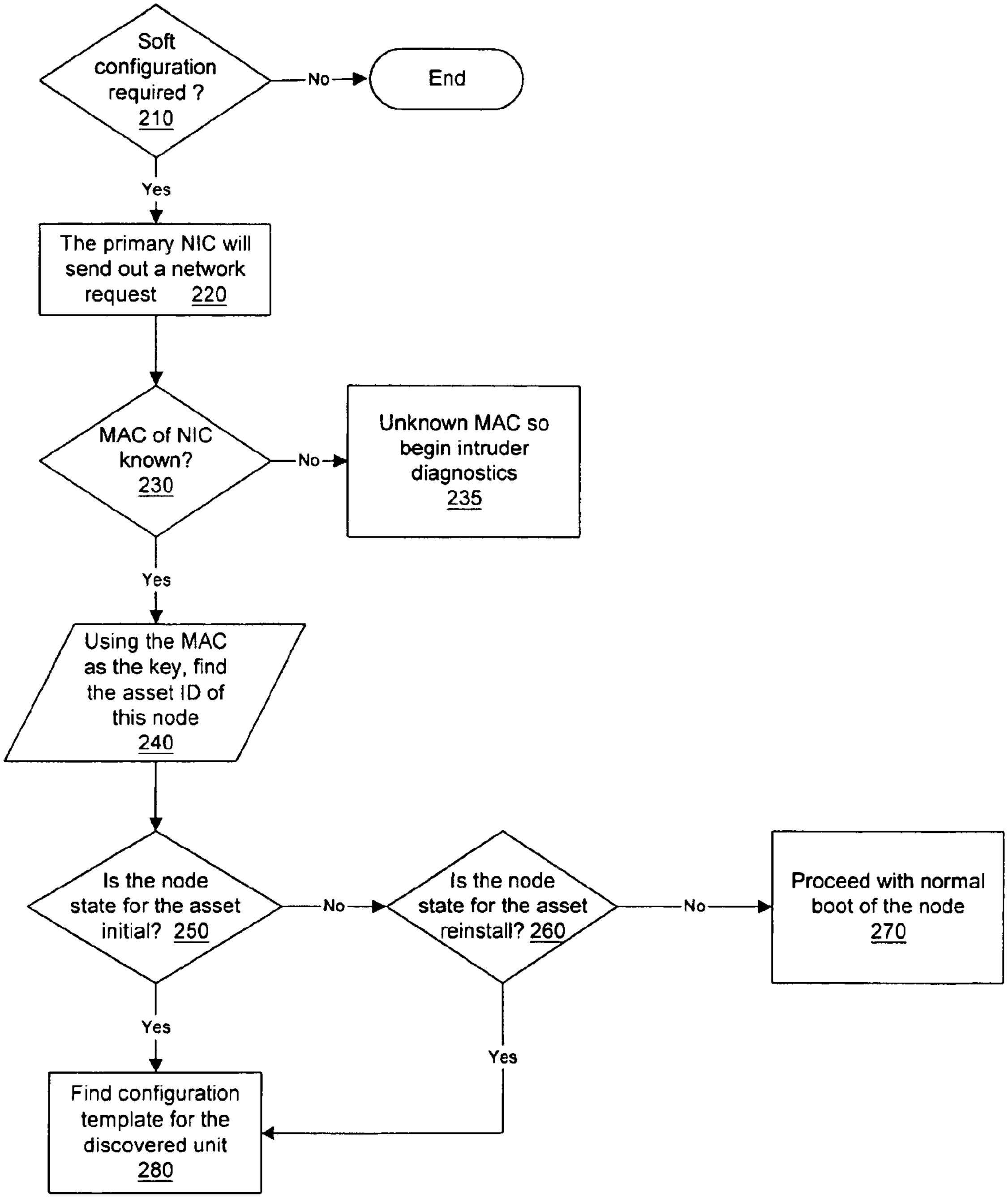
FIG. 2 is a flowchart illustrating new unit discovery according to one or more embodiments of the invention.

FIG. 2 is a flowchart illustrating new unit discovery according to one or more embodiments of the invention. At this point the node has been bolted into a rack, an asset record (described in detail with respect to FIG. 3) has been created, it has been plugged to power and networking and it has been powered on. The new unit discovery begins by checking if the node (unit as installed in the rack) requires soft configuration (block 210). An example of such a node is a "compute" node. A compute node is a unit that has large-scale data processing (computing) capability such as a personal computer system. Such nodes are often characteristic of servers and will often have one or more NICs (Network Interface Cards) which allow the node to communicate information on a network. The primary NIC will send out a network request (e.g. DHCP (Dynamic Host Control Protocol) request for an IP address) (block 220) which may also be accompanied by an explicit request for configuration data. This signals the management infrastructure that a node is booting up and is ready to be configured.

The MAC (Media Access Control) address of the NIC is a device signature unique to the NIC. The MAC uniquely identifies the NIC to the management system. MAC addresses are assigned at the time of manufacture and are guaranteed to be globally unique. All network messages sent by the NIC contain its MAC address to allow other nodes to communicate back to it. When a primary NIC sends out a network request message, the management system will compare the MAC sent by the node with all the MACs that are known (block 230). The known MACs will be those of devices that are in inventory or have been received by the company and thus, are present in the management system database. If the MAC is not known, then one possible explanation is that an intruder has penetrated the network. Thus, in this case of an unknown MAC, the management system will begin intruder diagnostics (block 235). Each node with network access in a data center must connect to a known good switch, determining the switch of origin will allow the management infrastructure to determine the location of the intruder. All unknown MACs are assumed to be intruders until verification is complete and the management infrastructure is updated.

If the MAC is known, then using the MAC as a key (or indexing parameter) the asset ID of the node is found (block 240). The next test is to see whether the state information (associated by and stored along with the asset ID) for the node indicates that the node is in the initial state (block 250). The initial state is when the node is first installed in a rack. If it is not in the initial state, then a further check is performed to see whether the node's state information indicates that it is in a reinstall state (block 260). If the node is neither in reinstall nor initial states, then it indicates that the node is undergoing a reboot. In this case, the node is allowed to proceed with its normal boot process (block 270). If the node is either in reinstall state (checked at block 260) or in the initial state (checked at block 250), then software needs to be installed. When in a reinstall state, the node is configured in a like manner to the initial state with the exception that a node needs to be scrubbed (i.e. have its hard drive erased). Hence, to determine which software to install and the parameters thereof, the management system finds an appropriate configuration template for the discovered unit (block 280).

Figure 3:
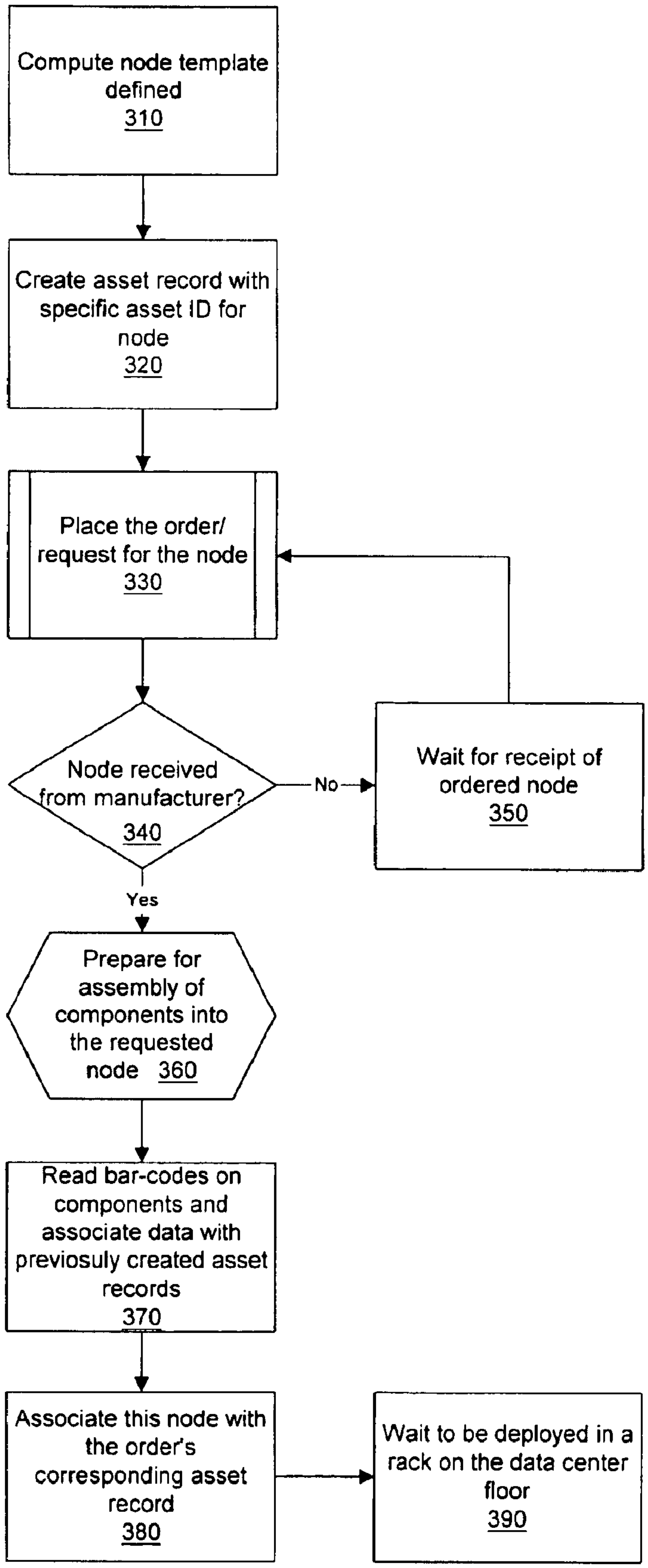
FIG. 3 is a flowchart illustrating associating of a node's configuration with the management system according to one or more embodiments of the invention.

FIG. 3 is a flowchart illustrating associating of a node's configuration with the management system according to one or more embodiments of the invention. First, the configuration template for a compute node (unit with computing capability) is defined (if it does not yet exist) or retrieved (if already present in the system) (block 310). This includes all optional (e.g. additional NICs, management cards) and configuration specifications (e.g. processor speed) for the node allowed by the manufacturer. Next, an asset record is created in the management system database with a specific and unique asset ID for the node (block 320). The asset record will track the configuration information (or pointers to the appropriate configuration template), soft configuration, state, asset ID, MAC and other pertinent information about the node. Each node has its own asset ID and asset record, which are all in one-to-one relationships with another. Once the asset record is created, all activities related to the node (which may or may not physically yet exist) can be tracked. After the asset record is created, the node is ordered or requested (block 330). As detailed information becomes available about the asset, it is entered in the asset record during each step of its purchase, assembly and installation. For example, the kind of processor in the asset or the amount of internal disk can be entered when the asset is ordered because that information is known when the purchase order is written. The ordering and receipt of the node can also be tracked within the created asset record. The management system can check to see if the node is received from the manufacturer after it has been ordered (block 340). If the node is not yet received, the management system must wait for receipt of the ordered node (block 350). If the node is received from the manufacturer (or vendor), then the assembly of the components into the requested node can be prepared for (for instance, if it has multiple components that need to be integrated together) (block 360). As part of this process, the bar-code information on the components is read and then the data therefrom is associated with the previously created asset record (block 370). Additionally, information about the MAC addresses of the NIC cards is recorded in the asset record. This allows the management system to find the soft configuration template associated with the node during the discovery process.

Next, the node is associated with the order's corresponding asset record (block 380). This allows the management system to associate other attributes of the node (e.g., processor type, amount of memory or internal disk) with the MAC address. The management system then waits for the node to be deployed in a rack on the data center floor (block 390). At this point the asset ID for the specific node has been associated with all MACs that will be accessing the network from that node. The asset record contains the configuration information (or a pointer to the configuration template) so that the process of installing and configuring software on the newly deployed node can be automatically carried out by the management system (or other dedicated system such as a software configuration system, detailed below) when it requests configuration information over the network as it is powered up.

Figure 4:
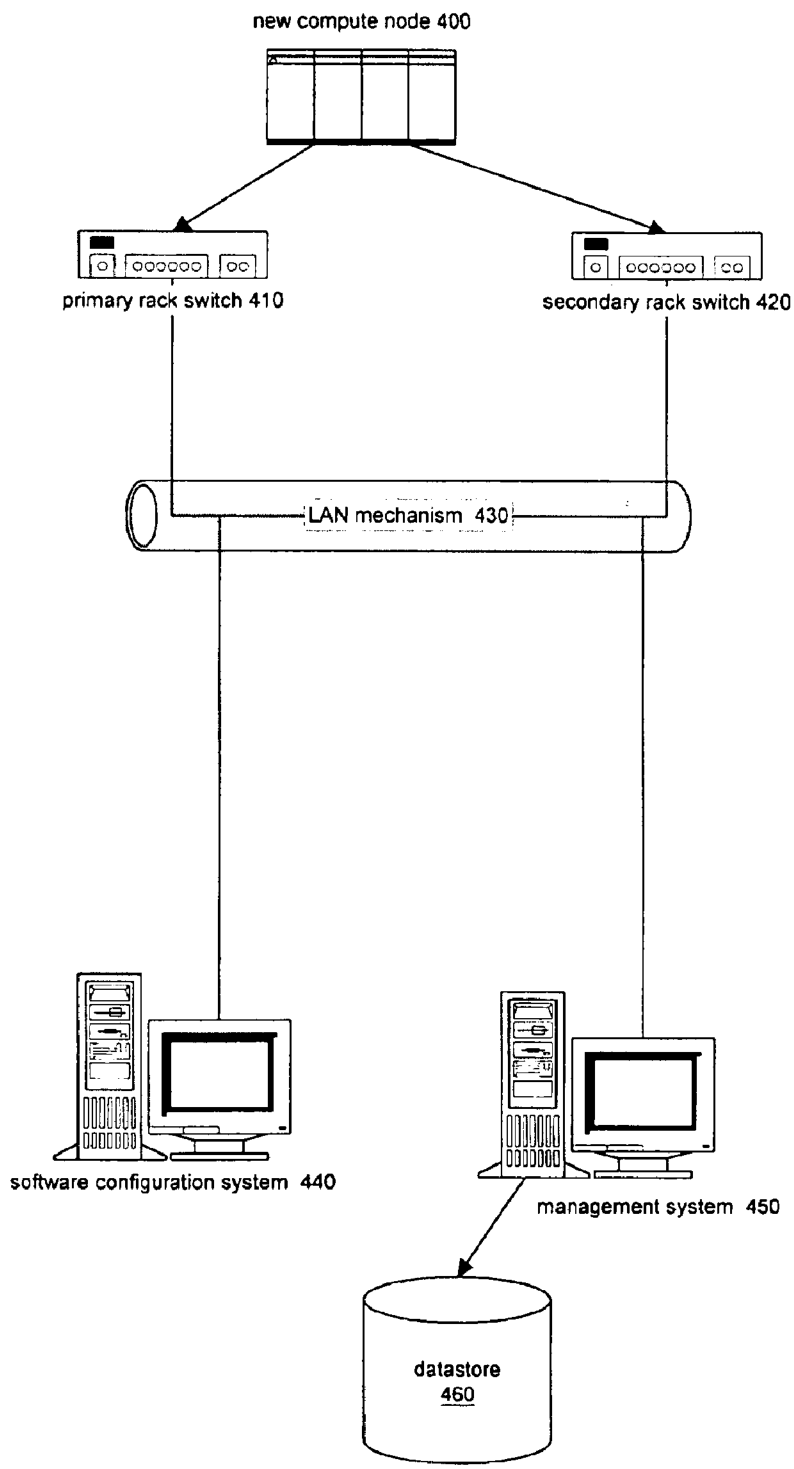
FIG. 4 is a diagram illustrating the interaction of the systems involved in implementing the various embodiments of the invention.

FIG. 4 is a diagram illustrating the interaction of the systems involved in implementing the various embodiments of the invention. At the data center, an internal LAN (Local Area Network) Mechanism 430 is used for network communications. LAN mechanism 430 may consist of mechanisms such as Ethernet for carrying LAN information traffic and may include protocols for interaction between users of the LAN, such as TCP/IP or IPX. The LAN mechanism 430 ties together various servers, devices, nodes and rack locations of the data center. A new compute node 400 may be deployed within a given rack and may contain one or more NICs that allow it to communicate over LAN mechanism 430. A first primary NIC of new compute node 400 will connect the new compute node 400 to a primary switch 410 which may also be deployed in the same rack. The primary switch 410 is a part of the LAN mechanism 430 and connects the primary NIC to the LAN mechanism 430. The new compute node 400 may optionally have a secondary NIC which will connect it to a secondary switch 420. The secondary switch 420 may also connect the secondary NIC to the LAN mechanism 430. Alternately the secondary switch 420 may connect the secondary NIC to a different LAN mechanism or network.

LAN mechanism 430 allows other systems such a software configuration system 440 and a management system 450 to be connected to each other and to new compute node 400. The software configuration system 440 serves applications and performs installs of applications to nodes. The management system 450 has database server software, which manages asset records that can be stored in a datastore 460 (e.g., a database). During new unit discovery, the management system 450 responds to a network request from the new compute node 400, once deployed in its rack. The management system 450 then compares the MAC of the primary NIC of compute node 400 with a list of MACs for known devices which may be stored in datastore 460. If known, the management system 450 finds the appropriate asset ID (and, consequently, asset record) associated with the node 400. It then sends a message to compute node 400 with pointers (contained in the asset record) to the correct software in the software configuration system 440. In one embodiment of the invention, the software configuration system may be a tftp (Trivial File Transfer Protocol) server. The compute node then requests the software configuration system for the software and loads it. Depending on the configuration, the node may also request other software from the software configuration system, or alternatively, the software configuration system may install other software on node 400.

The management system 450 is also responsible for tracking and maintaining state information regarding the new compute node 400. This state information can be stored in datastore 460 in an asset record corresponding to the new compute node 400. If the management system 450 determines, for instance, that the new compute node 400 is in an initial state, it will initiate software configuration system 440. The management system 450 will find a configuration template that corresponds to the asset class/type of the new compute node 400 which would be designated in its asset record. The configuration template that is found will then form the basis by which the software configuration system 440 decides how and what software will be installed onto new compute node 400. The software configuration system 440 then installs, automatically, the desired software onto the new compute node 400.

The management system 450 also initially creates the asset record at the time the new compute node 400 is requested or ordered, and maintains in that asset record any post-deployment information that would be desirable for further installation, monitoring or maintenance of the new compute node 400. The software configuration system 440 will contain installable versions of the software that is to be installed on nodes and application software that controls the installation process.

Figure 5:
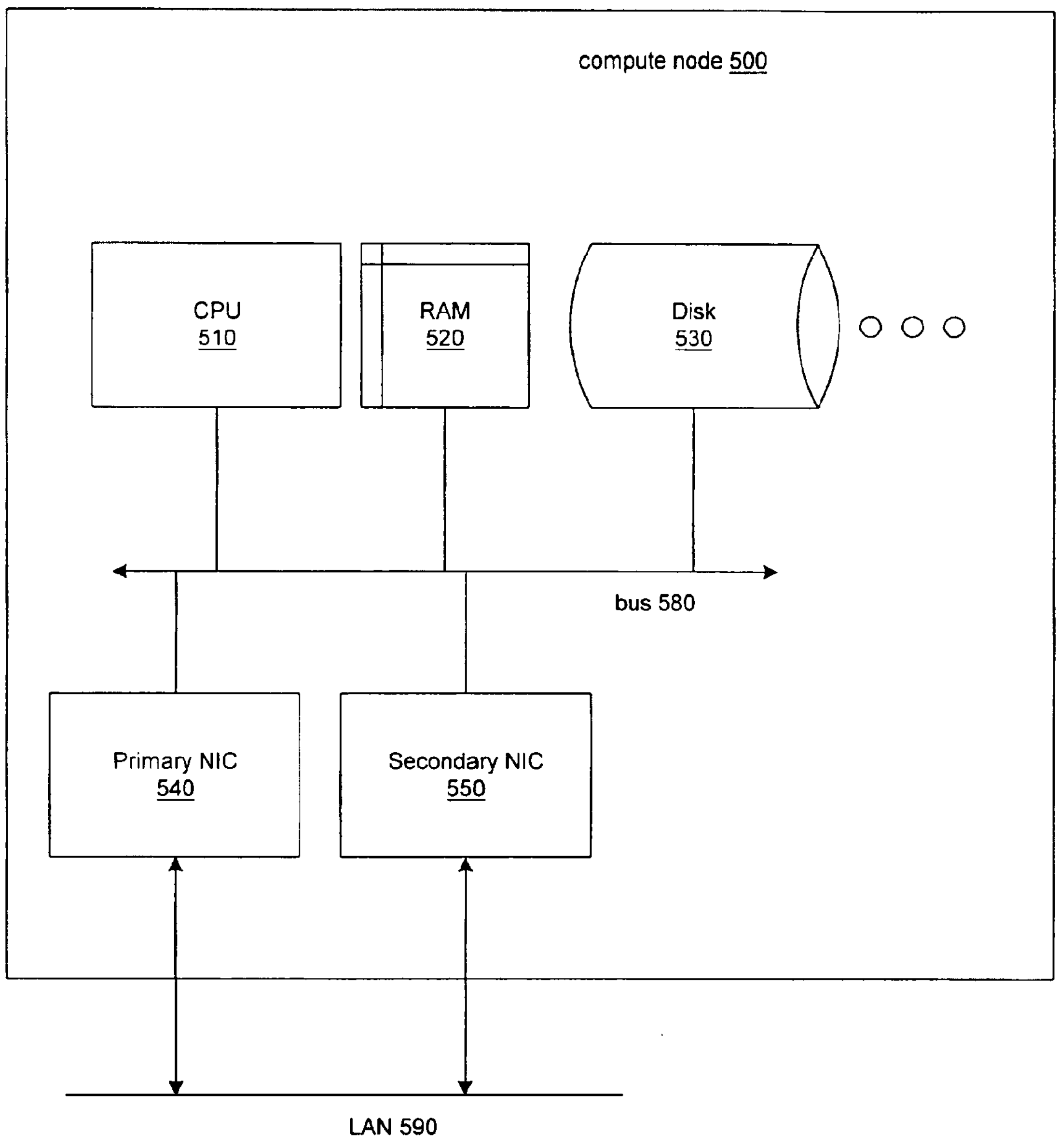
FIG. 5 is a diagram of a compute node which can be configured and managed in accordance with the various embodiments of the invention.

FIG. 5 is a diagram of a compute node which can be configured and managed in accordance with the various embodiments of the invention. The compute node 500 has a number of components such as a CPU (Central Processing Unit) 510 and RAM (Random Access Memory) 520. The compute node 500 also has a bus 580 that allows these components and others to communicate with each other. For instance, compute node 500 is shown having two NICs, a primary NIC 540 (so called because it is in the primary slot) and a secondary NIC 550. Each of these NICs are connected to other components within the node and to a LAN (Local Area Network) 590. LAN 590 is shown merely as an example of the possible networks that the NICs may connect to. Each of NICs 540 and 550 may instead connect to separate networks. For instance, the primary NIC 540 may be connected to LAN 590 while the secondary NIC 550 is connected to a WAN (Wide Area Network) such as the Internet. Bus 580 also connects other peripheral components such as a disk 530, which is non-volatile storage mechanism such as a hard drive.

In accordance with the invention, the compute node 500 may be assembled of the components—such as CPU 510, RAM 520, disk 530, primary NIC 540 and secondary NIC 550. Prior to assembly, the bar-code information for these components may be scanned and used to create asset record. When finally deployed, the compute node 500 will send a network request message through either NIC 540 or NIC 550. The management system will located the correct soft configuration information for the node using the MAC address of the NIC that sent the request. Next, the management system and software configuration system will install applications onto disk 530 of node 500 through one or both of the two NICs 540 and/or 550. If the MAC address of the NIC is not known to the management system, the management system may flag the request as a possible intrusion, and start appropriate security measures. Once these applications, such as operating system software, are configured on the node 500, it is then completely deployed as an operational part of its rack and of the data center in which its rack is housed. The CPU 510, RAM 520 and/or disk 530 may be of such a type, speed and capacity that would warrant installing only certain software or only certain optimized or un-optimized versions of the same software. The management system would be able to determine such parameters of the install based upon the asset information about the node 500 that is contained in its asset record.

When the compute node 500 boots, the components attached to the internal bus 580 become active in a specific order. Ordinarily, the primary NIC 540 being in the primary slot becomes active and can communicate with the LAN 590 before the compute node 500 is fully booted. This allows for the primary NIC 540 to act as a gateway for a new soft configuration for the node 500 to be done (soft configuration includes network identity, operating system, applications, etc.).

Figure 6:
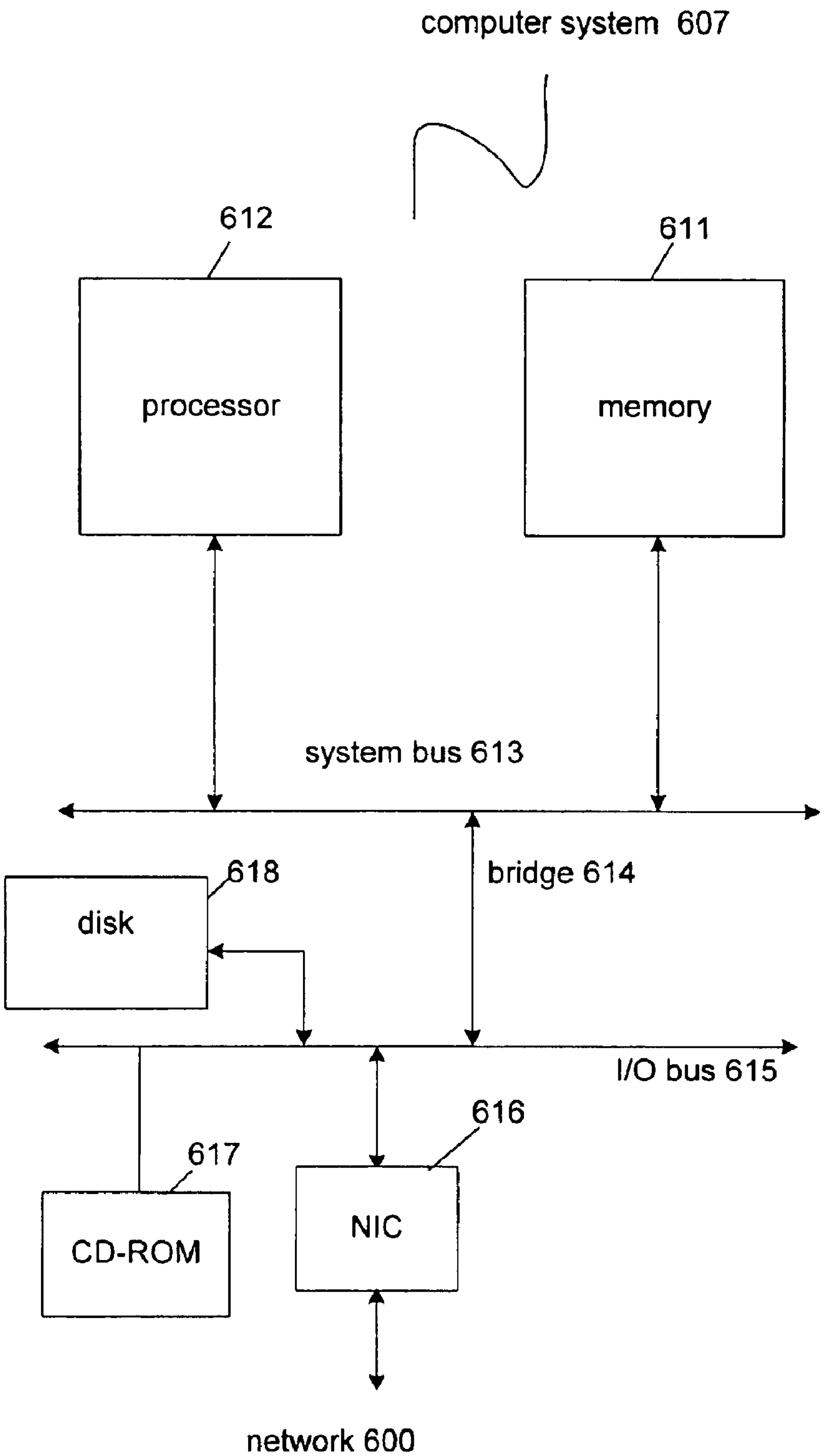
FIG. 6 is a diagram of a computer implementation of one or more embodiments of the invention.

FIG. 6 is a diagram of a computer implementation of one or more embodiments of the invention. Illustrated is a computer system 607, which may be any general or special purpose computing or data processing machine such as a PC (personal computer), coupled to a network 600. One of ordinary skill in the art may program computer system 607 to act as a management system server and/or a software configuration system server. The management system server and software configuration system server, are, in accordance with some embodiments of the invention, two separate and independently operating systems. However, it will be readily apparent that the functionality of both the management system and the software configuration system can be integrated onto as services of a single physical computer system such as system 607. According to one or more embodiments of the invention, the system 607 or systems similar to it, would be programmed to perform the following functions when implementing a management server:

- Building an asset record for an ordered/requested node;
- Receiving a network request from a deployed node;
- Comparing the MAC associated with received network requests with known MACs;
- Interacting, managing and maintaining a database of asset records;
- Determining, maintaining and updating state information regarding nodes; and
- Finding a software configuration template that corresponds to a node needing software installation.

According to one or more embodiments of the invention, the system 607 or systems similar to it, would be programmed to perform the following functions when implemented as a software configuration system server:

- Reading parameters contained in a software configuration template;
- Installing software applications on nodes needing such installation;
- Reinitializing non-volatile storage mechanisms in nodes already having installed software but desiring a re-install;

- Configuring said software applications during and after installation; and
- Upgrading or reconfiguring installed software applications on nodes when so desired.

In either role, system 607 has a processor 612 and a memory 611, such as RAM, which is used to store/load instructions, addresses and result data as desired. The implementation of the above functionality in software may derive from an executable or set of executables compiled from source code written in a language such as C++. The instructions of those executable(s), may be stored to a disk 618, such as a hard drive, or memory 611. After accessing them from storage, the software executables may then be loaded into memory 611 and its instructions executed by processor 612. The result of such methods may include calls and directives in the case that the asset records (and related information such as software configuration templates) are stored on disk 618, or a simple transfer of native instructions to the asset records database via network 600 if it is stored remotely. The asset records base may be stored on disk 618, as mentioned, or stored remotely and accessed over network 600 by system 607. Also, installable versions of software applications that are to be installed on deployed nodes may be stored on disk 618, as mentioned, or stored remotely and accessed over network 600 by system 607.

Computer system 607 has a system bus 613 which facilitates information transfer to/from the processor 612 and memory 611 and a bridge 614 which couples to an I/O bus 615. I/O bus 615 connects various I/O devices such as a network interface card (NIC) 616, disk 618 and to the system memory 611 and processor 612. The NIC 616 allows software, such as server software, executing within computer system 607 to transact data, such as requests for network addressing or software installation, to nodes or other servers connected to network 600. Network 600 is also connected to the data center or passes through the data center, so that sections thereof, such as deployed nodes placed in racks and management and software configuration systems, can communicate with system 607.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

We claim:

1. A method to automatically soft configure a node in a data center having a plurality of racks, where each rack is identified by a unique rack location, where the node is a rack-mountable node, and where the data center further includes various servers, devices, and rack locations, the method comprising:

- tying together the various servers, devices, and rack locations of the data center through a Local Area Network (LAN) mechanism;
- discovering a new unit deployed within the data center;
- finding a configuration template for the discovered unit; and
- automatically installing software on said discovered unit based upon said configuration template.

2. A method according to claim 1 wherein discovering includes:

- determining whether said unit requires soft configuration; and
- if said unit requires soft configuration, then receiving a network request for configuration data from said unit.-

3. A method according to claim 2 wherein said discovering further includes:

determining if the MAC (Media Access Control) address sent with said network request is of a known MAC.

4. A method according to claim 3 wherein determining includes:

extracting the MAC of the network device which originated said network request;

comparing the determined MAC with a list of known MACs, said MAC being known if said determined MAC is also found in said list.

5. A method according to claim 3 wherein if said MAC is known, then discovering further includes:

finding an asset ID in an asset records database, said asset ID based upon said MAC.

6. A method according to claim 5 further comprising:

determining the state of said unit;

if said state is one of initial and re-install, then proceeding with said finding of a configuration template; and if said state is not one of initial and re-install then proceeding with the normal boot sequence of said unit.

7. A method according to claim 3 further comprising:

if said determined MAC is not known, then proceeding with intruder diagnostics.

8. A method according to claim 1 further comprising:

prior to a new unit being deployed, associating the unit with an asset record.

9. A method according to claim 8 wherein associating includes:

creating said asset record with a specific asset ID, said asset ID tied to a fixed parameter of said unit;

waiting for said unit to be received and prepared for assembly;

correlating said received unit with said created asset record.

10. A method according to claim 9 wherein said correlating includes:

reading bar-code information on components of said unit;

determining which one of a plurality of asset records contains parameters that match said bar-code information; and associating said unit with said determined asset record, said determined asset record being the same as said created asset record for said unit.

11. A method according to claim 1 wherein said unit is mountable within a rack of said data center.

12. A method according to claim 9 wherein said fixed parameter is the MAC address of the primary Network Interface Card (NIC) of said unit.

13. A system to automatically soft configure a node in a data center having a plurality of racks, where each rack is identified by a unique rack location, where the node is a rack-mountable node, and where the data center further includes various servers, devices, and rack locations, the system comprising:

a data center deployable unit (node) connectable to a network;

a Local Area Network (LAN) mechanism configured to tie together the various servers, devices, and rack locations of the data center;

a management system server configured to manage a database of asset records, one of said asset records corresponding to said node, said management system server maintaining and updating state information about said node in its corresponding asset record, said management system server connected to said network; and a software configuration system server configured to automatically install software on said node once said node is deployed and connected to said network, said software configuration system server connected to said network.

14. A system according to claim 13 wherein said software configuration system is instructed on the manner and content of said installation by a software configuration template.

15. A system according to claim 13 further wherein said management system server is configured to:

determine whether said node requires soft configuration; and if said node requires soft configuration, then receiving a network request from said node.

16. A system according to claim 15 wherein said management system server determines if the MAC of the network device which initiated said request is a known MAC, said network device a part of said node.

17. A system according to claim 13 wherein said node is a computer system mountable within a rack in said data center.

18. A system according to claim 16 wherein said network device is a Network Interface Card (NIC).

19. A system according to claim 14 wherein said management system server finds the asset ID corresponding to said node upon said node sending a network request message.

20. A system according to claim 19 wherein said management system server is further configured to:

determine the state of said unit;

if said state is one of initial and re-install, then proceed with said finding of said configuration template; and if said state is not one of initial and re-install then allow said node to proceed with the normal boot sequence of said unit.

21. A system according to claim 13 wherein said management system server is configured to associate said node with its said corresponding asset record.

22. A system according to claim 21 wherein said management system sever is further configured to:

create said asset record with a specific asset ID, said asset ID tied to a fixed parameter of said unit;

wait for said unit to be received and prepared for assembly; and correlate said received unit with said created asset record.

23. An article to automatically soft configure a node in a data center having a plurality of racks, where each rack is identified by a unique rack location, where the node is a rack-mountable node, and where the data center further includes various servers, devices, and rack locations, the article comprising a computer readable medium having instructions stored thereon which when executed cause:

tying together the various servers, devices, and rack locations of the data center through a Local Area Network (LAN) mechanism;

discovering a new unit deployed within the data center;

finding a configuration template for the discovered unit; and automatically installing software on said discovered unit based upon said configuration template.

24. An article according to claim 23 wherein discovering includes:

determining whether said unit requires soft configuration; and if said unit requires soft configuration, then receiving a network request from said unit.

25. An article according to claim 24 wherein said discovering further includes:

determining if the MAC (Media Access Control) address sent with said network request is a known MAC.

26. An article according to claim 25 wherein if said MAC is known, then discovering further includes:

finding an asset ID in an asset records database, said asset ID based upon said MAC.

27. An article according to claim 26 that further causes:

determining the state of said unit;

if said state is one of initial and re-install, then proceeding with said finding of a configuration template; and if said state is not one of initial and re-install then proceeding with the normal boot sequence of said unit.

28. An article according to claim 23 that further causes:

prior to a new unit being deployed, associating the unit with an asset record.

29. An article according to claim 28 wherein associating includes:

creating said asset record with a specific asset ID, said asset ID tied to a fixed parameter of said unit;

waiting for said unit to be received and prepared for assembly;

correlating said received unit with said created asset record.

30. A method to automatically soft configure a node in a data center having a plurality of racks, where each rack is identified by a unique rack location and where the node is a rack-mountable node, the method comprising:

presenting a node as a set of components installed in a given rack, where the given rack is identified by a predetermined rack location and where at least one component of the set of components is characterized by at least one component attribute;

compiling a network request from the unique rack location of the given rack and the at least one component attribute;

providing power to the node, where providing power to the node automatically results in sending the network request from the node; and in response to sending the network request, automatically installing at least one application on the node to soft configure the node.

31. The method of claim 30, where presenting the node includes presenting the node as being attached to a rack switch, where the rack switch is identified by an origin and where compiling the network request includes determining the unique rack location by determining the origin of the rack switch to which the node is connected.

32. The method of claim 31, where compiling the network request additionally includes reading bar-code information on the at least one component.

33. The method of claim 31, where the rack switch is one of a primary rack switch and a secondary rack switch.

34. The method of claim 30, where the data center is divided into a plurality of predefined areas including a shipping/docketing area, an assembly area, and a rack area having the plurality of racks.

35. The method of claim 34, where the data center further includes various servers, devices, nodes, and rack locations, the method further comprising:

tying together the various servers, devices, nodes, and rack locations of the data center through a Local Area Network (LAN) mechanism.

36. The method of claim 30, where the application is operating system software and, after automatically installing at least one application on the node to soft configure the node, the method further comprising:

configuring the operating system software on the node to completely deploy the node as an operational part of the given rack into which the node is installed.

37. The method of claim 30, where the set of components are designated a unit before being installed in the given rack and, prior to presenting a node, the method further comprising:

presenting a management system housing a plurality of configuration templates and configured to house an asset record, where each configuration template includes a series of configuration parameters and instructions for each category into which the unit may be categorize.

38. The method of claim 37, prior to presenting a node as a set of components installed in a given rack, the method comprising:

ordering the set of components as a unit through a purchase order, where the purchase order includes an order attribute list, where the order attribute list identifies ordered attributes of the set of components;

creating an asset record from the order attribute list;

associating the asset record with the ordered unit based on a parameter; where the parameter includes a Media Access Control (MAC) address of a Network Interface Card (NIC) of the ordered unit; and creating an asset ID that uniquely identifies the ordered set of components and the predetermined rack location; and housing the asset record and the asset ID in the management system such that the asset ID and the asset record are in a one-to-one relationships with each other.

39. The method of claim 38, where the ordered attributes of the set of components includes a specified amount of memory and number of ports and includes a list of model numbers.

40. The method of claim 38 further comprising:

receiving the set of components into inventory;

creating an inventory attribute list by comparing attributes in the received set of components with those ordered attributes listed in the order attribute list;

updating the asset record with the inventory attribute list.

41. The method of claim 40, where receiving the set of components into inventory occurs before ordering the set of components.

42. The method of claim 40 further comprising:

determining a Media Access Control (MAC) address of the set of components from a Network Interface Card (NIC) in the set of components; and updating the asset record with the determined Media Access Control (MAC) address.

43. The method of claim 40 further comprising:

in response to sending the network request, finding a configuration template in the management system by comparing the predetermined rack location in the network request with the rack locations in each asset ID; and sending to the node the found configuration template.

44. The method of claim 40 further comprising:

determining whether the node is in a reinstall state; and if the node is in a reinstall state, then first scrubbing the node before soft configuring the node.

45. The method of claim 40 further comprising:

if at least one of ordering, inventorying, assembling, installing, and operating the node, then updating the asset record.

* * * * *